UNITED STATES PATENT OFFICE.

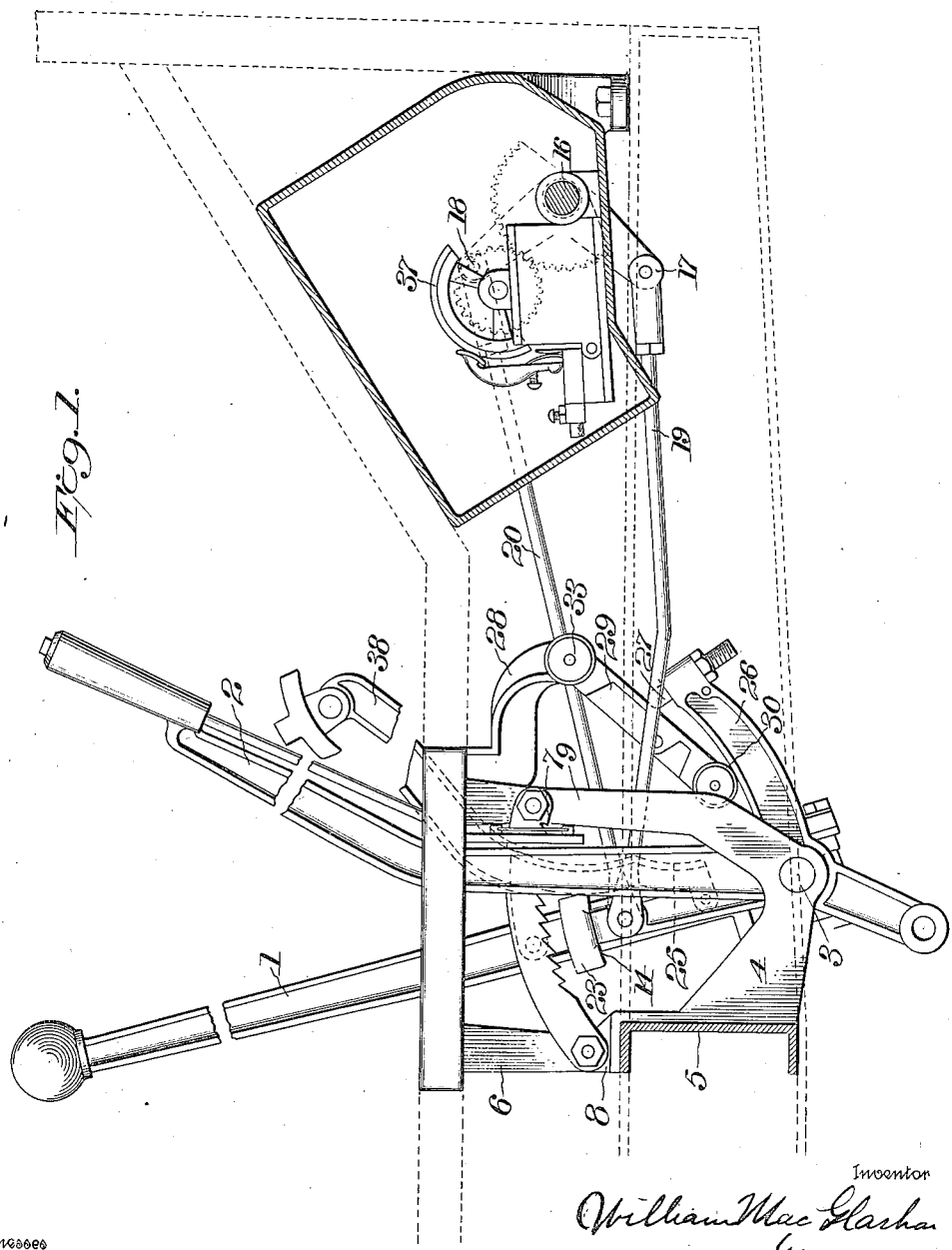

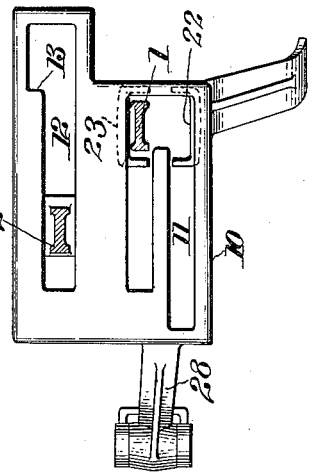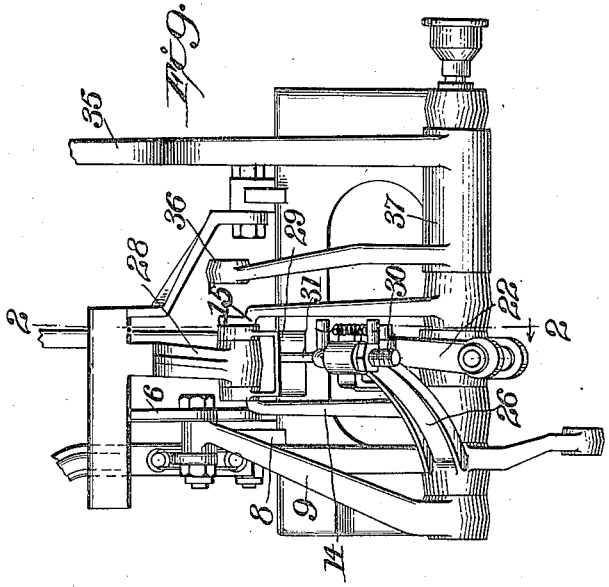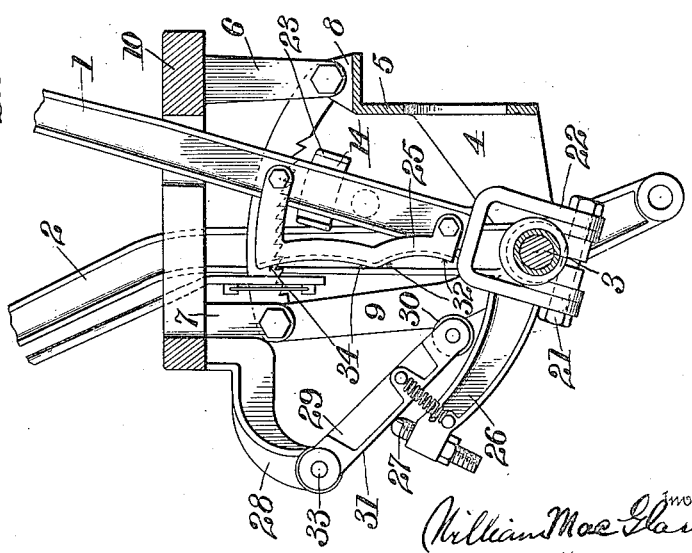

WILLIAM MacGLASHAN, OF SOUTH BEND, INDIANA, ASSIGNOR TO THE STUDEBAKER CORPORATION, OF SOUTH BEND, INDIANA, A CORPORATION OF NEW JERSEY.

CONTROL MECHANISM.

1,125,575. Specification of Letters Patent. Patented Jan. 19, 1915.

Application filed February 5, 1913. Serial No. 746,330.

*To all whom it may concern:*

Be it known that I, WILLIAM MacGLASHAN, citizen of the United States of America, residing at South Bend, St. Joseph county, State of Indiana, have invented certain new and useful Improvements in Control Mechanism, of which the following is a specification.

This invention relates to a mechanical control for motor vehicles.

The device of the invention, in its preferred form, is constructed as a unit having its various moving parts mounted on a single bracket or support on which the entire control may be assembled and inserted in its assembled form in the machine, the bracket being secured to a convenient member forming a part of the vehicle frame, thus making it possible to assemble the control at the bench and avoiding the much more expensive operation of setting it up on the assembly floor.

The device described is particularly adapted for use on an electrically driven road vehicle, and has as an object to overcome various difficulties now encountered in connection with such controls.

As applied to electrically-propelled vehicles, the control, which is the subject of the invention, has the virtue, unusual in electric controls, of having a single lever with a short swing by means of which the motor may be operated at the various forward speeds and also at various speeds in reversing or running backward. The device also includes a connection between the emergency brake lever and the control lever by means of which the latter is thrown to neutral position when the brake is applied and held at neutral, as the pressure on the brake lever and the tension of the brake is increased without under these circumstances in any way increasing the pressure on the control lever or the resistance to the application of the emergency brake. This device prevents damage to the transmission and possible burning of the motor by accidental use of the emergency brake in opposition to the motor.

In the accompanying drawings a controller embodying the features of my invention in its preferred form is illustrated.

Figure 1 is a side elevation looking from the right side of the vehicle. Fig. 2 is a central, vertical section on the line 2, 2 of Fig. 3. Fig. 3 is a front elevation. Fig. 4 is a plan of the slotted plate guiding the control lever and the brake lever, the levers being shown in section therein.

Referring to the drawings by numerals, each of which is applied to the same or equivalent parts of the different figures of the drawing, the control lever 1 and the emergency brake lever 2 are mounted on a single transverse shaft 3 carried by a bracket 4 having a base plate 5 adapted to be secured to one of the members of the vehicle frame. Rigidly mounted on this bracket, having depending lugs 6 and 7, which are secured to upright lugs 8 and 9 on the bracket, is a slotted plate 10 which serves as a guide for the brake and control levers. The latter extends upward through a U-shaped slot 11 in the plate, and the emergency brake lever rides in the slot 12 having a retaining seat 13 at the rear into which the lever may be thrown when the brake is on in full.

One of the difficulties encountered in the production of a mechanical device for operating an electric control for motor vehicles, is that of rotating the electric control through a sufficient arc by a single short-throw lever to give the desired changes of speed. This is accomplished in the present instance by means of two crank arms 14 and 15 mounted to rotate relatively to the shaft 3. The controller shaft or a shaft which is geared thereto, indicated by reference character 16, is provided with two crank arms 17 and 18 rigidly secured thereto and placed substantially at right angles one to the other. Of these one is connected by the rod 19 to the arm 14, and the other by the rod 20 to the arm 15. The controller lever 1, in addition to being pivoted to swing about the shaft 3, is also pivoted by means of the pin 21 and the jaws 22 to swing in the plane of the length of the shaft 3, i. e., to swing laterally. The arms 14 and 15 are provided each with jaws 23 laterally disposed and opening toward the lever 1. When the lever 1 is at the rear end of the U-shaped slot 11, i. e., at the base of the U, the controller is in neutral position, i. e., no current is passing through the motor, and in this position both of the arms 14 and 15 and the jaws 23 are alined with the lever 1, so that that lever may be moved laterally into engagement with either jaw, and when thus engaged may be used to rotate the arm carrying that jaw in a forward direction and to move that jaw backward to its original position.

By reference to Fig. 1 it will be noted that when the lever 1 is in neutral position, the crank arm 18 on the shaft 16 is above the center of that shaft and the crank arm 17 is below the center, i. e., the crank arms 17 and 18 with the crank pins carried thereby, are on opposite sides of a plane including the axis about which they rotate, the plane being drawn in a general way at right angles to the control lever in normal or neutral position, and that by thrusting forward the top connecting rod 20, the controller will be rotated from neutral position through an arc in one direction, and by thrusting forward the connecting rod 19, the controller will be rotated from its neutral position an arc in the opposite direction. In this way the dead points of both cranks 17 and 18 are avoided. The U-guide gives two parallel paths and thus by moving the lever 1 forward in one leg of the U or path, in which case it is in engagement with the arm 14, the controller will be rotated through a certain arc. By bringing the lever back to neutral, the controller will be returned through the same arc to neutral. By swinging the lever over into the other path or leg of the U, it will engage the arm 15 and by throwing it forward, the controller will be rotated from neutral in the opposite direction through an arc opposite and corresponding to the one first rotated, and by bringing the lever back, the controller will be returned to its original or neutral position. In operation the left leg of the slot is used for all positions running forward and the right leg for all positions of reversing, and the lever 14, the rod 19 and the arm 17 have a function corresponding to that of one leg of the U, and the parts 15, 20 and 18 operate in conjunction with the other leg of the U. Thus the shaft 16 and the controller are rotated through twice the arc with a given throw of the lever 1 that could be accomplished with a single connecting rod and the same throw of the lever 1.

For the purpose of throwing the control out and stopping the motor when the emergency brake is applied and for locking the control at neutral as long as the brake is on so the emergency brake and drive cannot operate simultaneously, the control lever 1 is provided with a cam member 25 rigidly secured thereto, and the brake lever 2 is provided with an arm 26 having a follower member 27. Pivotally mounted on the fixed bracket 28 is a swinging arm 29 carrying a cam follower 30 to coöperate with the cam 25, and the follower 27 is so placed as to coöperate with the bearing face 31 of the arm 29. The cam 25 is so formed that the lower portion of its surface 32 is inclined to the arc swung by the roller 30 when the arm 29 is rotated, so that when the brake is applied, the controller being forward, the arm 26, being thrown up, swings the arm 29 with the roller 30 upward about the center 33, engaging the inclined cam surface 32 and throwing the controller back to neutral, the upper point of the surface 32 being so placed that as the roller rides over this point, the lever 1 is forced to neutral position, but beyond this point the surface 34 is in the form of an arc concentric with the axis 33, and as the pressure on the brake is increased and the brake lever swings backward, the control lever 1 is merely held in neutral position and remains locked in that position until the brake is released.

At the righthand end of the shaft 3, as the device is seen in Fig. 3 and from the front of the machine, there is mounted a foot-brake lever 35, the foot-brake being connected to the arm 36 which operates from the hub 37 thereof.

The operation of the device will be fully apparent from the description taken in connection with the drawings. The controller cylinder 37, as seen in Fig. 1, is geared to the shaft 16 and rotates through a corresponding but increased arc as the shaft 16 is turned. The latter is rotated through one arc preferably about 90°, as the controller lever is moved forward in one leg of the U-shaped slot and through another arc which may be of 90° as the lever is moved forward in the other leg of the U-shaped slot, the controller cylinder being rotated in one direction from neutral through an arc depending on the ratio of gearing by the throw of the lever in one side of the slot and being rotated a corresponding arc on the other side of neutral by the throw of the lever in the other side of the slot. Thus the cylinder may be rotated through any arc desired or given a complete turn of 360° and full control in running forward and backward is obtained by a single short-throw lever.

While the device described is particularly adapted for use in connection with electrically driven vehicles, it may be applied with equal facility to internal combustion motors, an important advantage in both cases being that all the parts are mounted on a single bracket so that they can be assembled at the bench and inserted in the machine in their operative relation as a single unit.

Another advantage of the construction described is found in the fact that an extra control all set up ready for operation may be kept ready at hand, and in case of failure of one, the other may be substituted at a moment's notice. The practicability of this arrangement is apparent particularly where a number of similar machines are owned by one interest as is common in the case of motor trucks, taxicabs, etc.

The device of the invention in its preferred form has been described in detail in order that its nature and operation may be clearly understood, but the scope of the invention is not limited to the details described and shown.

What I claim and desire to secure by Letters Patent is:

1. In an electrically driven vehicle, a rotating controller cylinder and means for operating the same, consisting of two crank pins separated by a considerable arc and positively connected to the cylinder, a single control lever mounted to swing in two planes, means for guiding the same to move in parallel paths, two connecting rods, one leading from each of the crank pins to a point adjacent the control lever, and means on one connecting rod for engaging the control lever when in one path, and means on the other connecting rod for engaging the control lever when in the other path whereby the control lever, when in engagement with one connecting rod, serves to move the controller cylinder back and forth through one arc, and when in engagement with the other connecting rod, rotates the cylinder back and forth through another arc.

2. In a motor vehicle, a rotating control member, two crank pins connected thereto and separated by a considerable arc, a control lever mounted to swing in two parallel paths, and means connecting the control lever when in one path to one crank pin and when in the other path to the other crank pin, the crank pins being on opposite sides of a line connecting the center about which they rotate, to the point on the control lever where it is engaged by the connecting means, whereby the control member may be rotated by the controller lever through substantially twice the arc available by a single connection.

3. In a motor vehicle, a control lever mounted to move in two parallel paths, two swinging arms, one on each side of the control lever, each arm having means to engage the control lever, one to engage the lever in one path, the other to engage it in the other path, a rotating member and separate means connecting each arm to the rotating member to be controlled, whereby rotation of the same member through one arc is produced when the control lever is in connection with one arm and rotation of the said rotating member through another arc is produced when the control lever is in engagement with the other swinging arm.

4. In a motor vehicle control, a single rotating member having two points of connection separated by a considerable arc, a single control lever mounted to move in two parallel paths, the two points of connection being normally on opposite sides of a plane including the axis of the rotating member and drawn substantially at right angles to the control lever in mid-position, means connecting the control lever when in one path with one point of connection, and when in the other path with the other point of connection whereby the rotating member is moved back and forth through one arc when the control lever is in engagement with one said point, and back and forth through another wholly different arc when the control lever is in engagement with the other said point.

Signed by me at South Bend, Indiana this 28th day of January 1913.

WILLIAM MacGLASHAN.

Witnesses:
FREDK. BRUNN,
JOHN F. COTTER.